United States Patent [19]

Kouda

[11] Patent Number: 4,591,935
[45] Date of Patent: May 27, 1986

[54] IDLER DRIVE MECHANISM WITH POSITIONAL CONTROL

[75] Inventor: Kazuo Kouda, Yokohama, Japan

[73] Assignee: Victor Company of Japan, Limited, Japan

[21] Appl. No.: 403,345

[22] Filed: Jul. 30, 1982

[30] Foreign Application Priority Data

Jul. 31, 1981 [JP] Japan .............................. 56-114172[U]
Jul. 31, 1981 [JP] Japan .............................. 56-114173[U]

[51] Int. Cl.$^4$ .............................................. G11B 15/28
[52] U.S. Cl. ..................................... 360/96.3; 360/71; 242/201
[58] Field of Search ............................... 360/71–72.1, 360/74.1, 90, 93, 95, 84–85, 96.1–96.3, 96.4; 242/199–201

[56] References Cited

U.S. PATENT DOCUMENTS

| | | | |
|---|---|---|---|
| 3,934,270 | 1/1976 | Iwata ................... | 242/200 |
| 4,185,794 | 1/1980 | Mukaida .............. | 242/201 |
| 4,196,874 | 4/1980 | Ohara ................... | 242/201 |
| 4,209,812 | 6/1980 | Umezawa et al. ... | 360/96.2 |
| 4,328,520 | 5/1982 | Iwata et al. .......... | 360/96.3 |
| 4,408,236 | 10/1983 | Murata et al. ....... | 360/85 |
| 4,422,114 | 12/1983 | Sugihara .............. | 360/96.3 |

FOREIGN PATENT DOCUMENTS 1246266 4/1958 Fed. Rep. of Germany .

Primary Examiner—Stuart N. Hecker
Assistant Examiner—David J. Severin
Attorney, Agent, or Firm—Lowe, King, Price & Becker

[57] ABSTRACT

An idler drive mechanism for particular use in video tape recorders has an idler wheel drivable by a motor-driven roller and movable into driving contact with a supply reel disc or a takeup reel disc for rotating the same at a rapid rate in a forward or reverse search mode of operation. The idler wheel is rotatably supported on an arm assembly operatively connected by a torsion spring to a slide lever. When the slide lever is displaced in one direction, in the forward or reverse search mode, the torsion spring urges the idler roller into contact with the supply or takeup reel disc. When the slide lever is displaced in the opposite direction, in the recording and reproducing modes of operation, the torsion spring is released into its free state, allowing the idler roller to be retracted out of contact with the supply or takeup reel disc. An idler wheel locking device causes the idler wheel to be retained in a locked position away from the supply or takeup reel disc when the video tape recorder is in the recording or reproducing mode.

12 Claims, 8 Drawing Figures

4,591,935

IDLER DRIVE MECHANISM WITH POSITIONAL CONTROL

BACKGROUND OF THE INVENTION

The present invention relates to an idler drive mechanism for use in magnetic recording apparatus such as video tape recorders, and more particularly to an idler drive mechanism having an idler wheel movable into driving contact with supply and takeup reel discs in foward and reverse search modes and retainable in a locked position away from the supply and takeup reel discs in a normal recording or reproducing mode.

SUMMARY OF THE INVENTION

It is an object of the present invention to provide an idler drive mechanism for particular use in video tape recorders which has an idler wheel movable into contact with supply and takeup reel discs for forward and reverse search modes and lockable out of contact with the supply and takeup reel discs in a recording or reproducing mode for allowing the supply and takeup reel discs to rotate smoothly.

Another object of the present invention is to provide an idler drive mechanism for particular use in video tape recorders which permits the video tape recorder to enter a normal reproducing mode directly from a forward or reverse search mode without having to go through a stop mode.

According to the present invention, an idler drive mechanism for use in a magnetic tape recording apparatus having a pair of supply and takeup reel discs, the magnetic tape recording apparatus being operable in forward and reverse search modes and recording and reproducing modes, comprises a base, a drive roller drivably mounted on the base, an arm assembly pivotably mounted on the base, an idler wheel rotatably supported on the arm assembly for being movably disposed between the supply and takeup reel discs and held in driven contact with the drive roller, a slide lever slidably supported on the base and movable in a first direction when in the forward or reverse search mode and in a second direction when in the recording or reproducing mode, and a spring operatively coupled between the arm assembly and the slide lever for urging the idler wheel into driving contact with the supply or takeup reel disc when the slide lever is displaced in the first direction. The spring is releasable to a free state thereof when the slide lever is displaced in the second direction for thereby retracting the idler wheel away from the supply or takeup reel disc. An idler wheel locking device has a locking pin which can project through the base into engagement with the arm assembly to retain the idler wheel in a locked position spaced from the supply or takeup reel disc when the slide lever is displaced in the second direction.

BRIEF DESCRIPTION OF THE DRAWINGS

The present invention will be described in detail by way of an illustrative example with reference to the accompanying drawings, in which.

DETAILED DESCRIPTION

Figure 1:
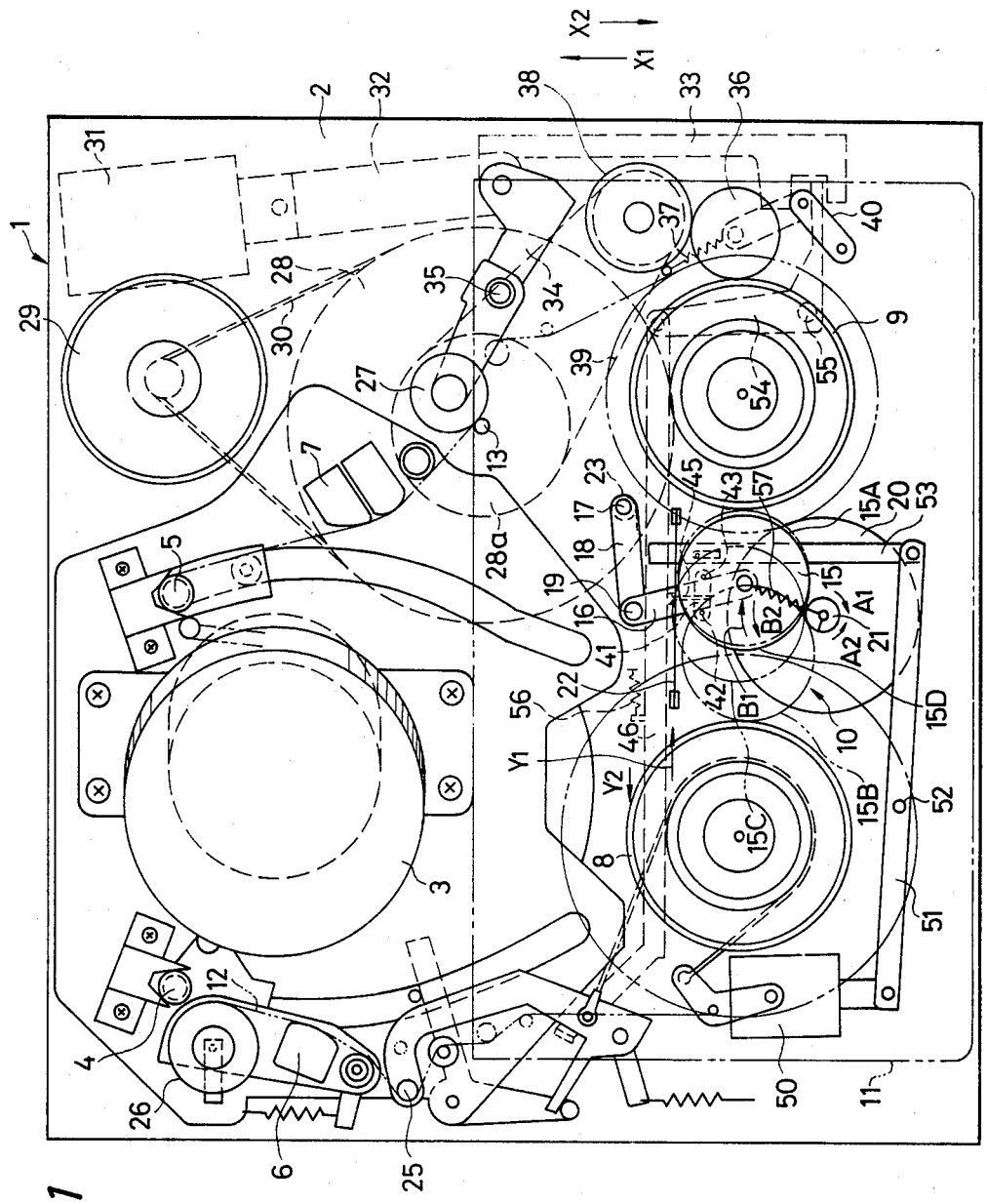
FIG. 1 is a plan view of an interior of a cassette video tape recorder incorporating therein an idler drive mechanism according to the present invention.

As shown in FIG. 1, a cassette video tape recorder 1 comprises a main deck or base 2, a tape guide system disposed on the main deck 2 and having a head drum 3, a pair of guide poles 4, 5 positioned one on each side of the head drum 3, an erase head 6, an audio control head 7 and other elements, and an idler drive mechanism 10 movably disposed between a supply reel disc 8 and a takeup reel disc 9 drivably mounted on the main deck 2. A video tape cassette 11 is removably mounted on the main deck 2 and includes supply and takeup hubs (not shown) which fit on the supply and takeup reel discs 8, 9, respectively. The idler drive mechanism 10 has an idler wheel 15 angularly movable into contact with the supply reel disc 8 or the takeup reel disc 9 to rotate the same for feeding a tape 12 at a high speed for a search mode in a reverse or forward direction. In a normal recording or reproducing mode of operation, the takeup reel disc 9 is driven by rotative power transmitted from a capstan 13, and the idler wheel 15 is retracted out of contact with both the supply and takeup reel discs 8, 9 so that the latter will rotate smoothly.

Figure 2:
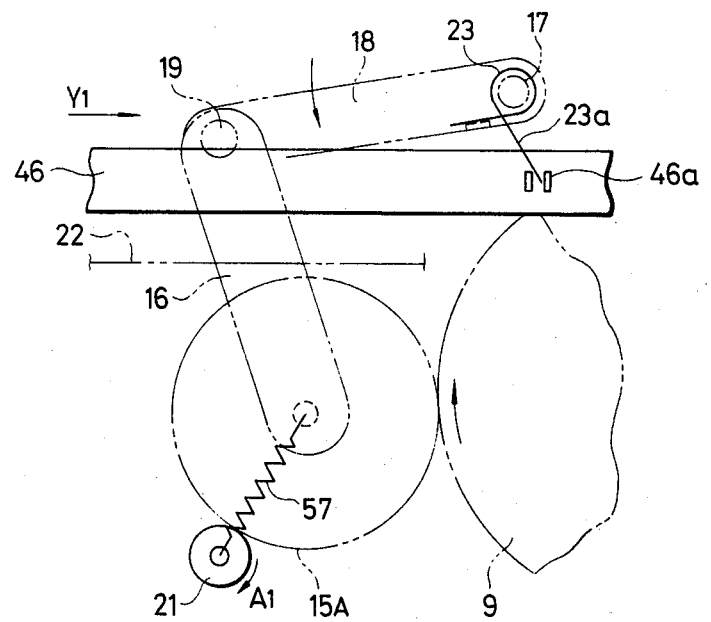
FIG. 2 is an enlarged fragmentary plan view, with some parts omitted from illustration, of the idler drive mechanism with an idler wheel held in driving contact with a takeup reel disc.

The idler drive mechanism 10 has a first arm 16 supporting the idler wheel 15 rotatably mounted on a distal end thereof, and a second arm 18 rotatably mounted at one end thereof by a pin 17 on the main deck 2 and pivotably connected at the other distal end to the other end of the first arm 16. The idler wheel 15 is thus angularly or swingably movable between the supply and takeup reel discs 8, 9. The idler wheel 15 is held in driven contact with a drive roller 21 of a motor 20 supported on the main deck 2, and is normally urged by a spring 57 in a direction to contact the drive roller 21. Although not shown, the idler wheel 15 has a clutch mechanism for imposing a load on its shaft to enable the idler wheel 15 to effect its swinging motion. A leaf spring 22 is disposed adjacent to the idler wheel 15 remotely from the drive roller 21 for moving the idler wheel 15 in cooperation with the motor 20. The second arm 18 is normally urged to turn counterclockwise (FIG. 1) about the pin 17 by a torsion spring 23 which acts between the second arm 18 and a slide lever 46. As better shown in FIGS. 2 and 3, the torsion spring 23 has an arm 23a held in engagement with a spring retainer 46a. The spring 57 has a resilient force which is substantially smaller than that of the spring 23. The idler wheel 15 is pressed against the drive roller 21 and one of the supply and takeup reel discs 8, 9 at a time under the combined force from the spring 57 and the torsion spring 23.

During a normal reproducing mode of operation, the parts of the video tape recorder 1 assume the position shown in FIG. 1. The video tape 12 as it is unwound from the supply hub is drawn out of the cassette 11 and goes past a tensioning pole 25, the erase head 6, an impedance roller 26 into contact with an angular peripheral area of the head drum 3 which is defined by the guide poles 4, 5 for reproducing video signals. The video tape 12 as it leaves the head drum 3 is held against the audio control head 7 and then sandwiched between the capstan 13 and a pinch roller 27 before the tape 12 reenters the cassette 11 and is wound around the takeup hub therein. The capstan 13 is integral with a flywheel 28 which is driven by a capstan motor 29 through a belt 30.

When the operator depresses a control button for starting the reproducing mode, a first plunger 31 supported on the main deck 2 is energized to displace first and second interconnected levers 32, 33 in the direction of the arrow $X_1$, whereupon a pinch roller arm 34 is turned counterclockwise about a pin 35 to press the pinch roller 27 against the capstan 13 with the tape 12 therebetween. At the same time, the movement of the second lever 33 allows an idler wheel 36 to move under the force of a spring 37 into an operating position in which the idler wheel 36 is held against the takeup reel disc 9 and a drive roller 38 which is drivably connected by a belt 39 to a step 28a of the flywheel 28. Therefore, the takeup reel disc 9 is caused to rotate in a tape winding direction (clockwise in FIG. 1) by the drive roller 38 through the idler wheel 36. The idler wheel 36 is movably supported on the main deck 2 by a pair of arms 40 pivotably connected to each other.

In a forward search mode of operation, the motor 20 is energized to rotate in a forward direction to rotate the drive roller 21 in the direction of the arrow $A_1$, thereby angularly displacing the idler wheel 15 about the drive roller 21 in the direction of the arrow $B_1$ into a position 15A in which the idler wheel 15 is held in driving contact with the takeup reel disc 9. The takeup reel disc 9 now rotates in a forward direction to effect the forward search mode of operation.

When a reverse search mode is to be performed, the motor 20 is energized to rotate in a reverse direction to rotate the drive roller 21 in the direction of the arrow $A_2$. Then, the idler wheel 15 is angularly moved around the drive roller 21 in the direction of the arrow $B_2$ until the idler wheel 15 is held in driving contact with the supply reel disc 8 in a position 15B. The supply reel disc 8 is caused to rotate counterclockwise for the reverse search mode of operation.

Upon release of control for the forward or reverse search mode of operation, the video tape recorder 1 enters directly the normal reproducing mode without going through a stop mode.

The idler drive mechanism 10 will be described in more detail. The slide lever 46 extends across the first arm 16 and is pivotally connected to an L-shaped lever 54 mounted by a pin 55 on the main deck 2 and held in operative engagement with an end of the second lever 33. The slide lever 46 is slidably movable in its longitudinal direction of the arrow $Y_1$ or $Y_2$ when the second lever 33 is longitudinally displaced in the direction of the arrow $X_1$ or $X_2$. The slide lever 46 is normally urged by a spring 56 to move in the direction of the arrow $Y_1$ during a fast forward or rewinding mode of operation, that is, forward or reverse search mode of operation.

When in the forward search mode, for example, the second arm 18 is biased to turn counterclockwise (FIG. 2) under the resiliency of the torsion spring 23 with its arm 23a pulled to the right by the spring retainer 46a. The idler wheel 15 is thus held against the takeup reel disc 9 for driving the latter.

Figure 3:
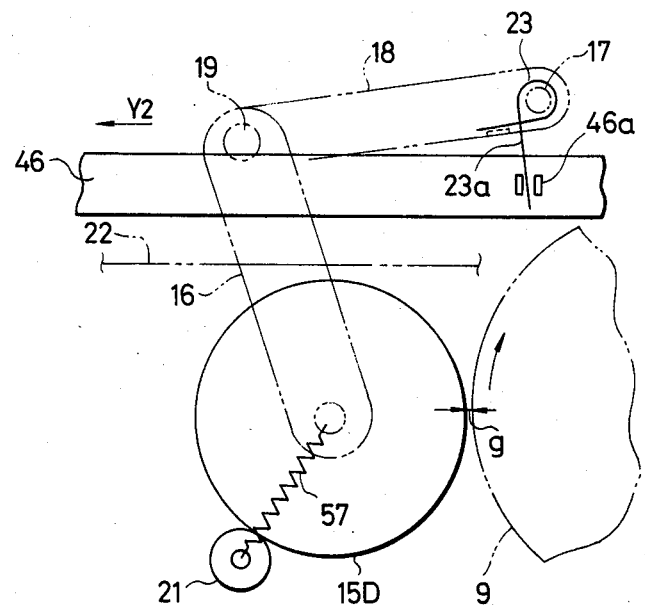
FIG. 3 is a view similar to FIG. 2, showing the idler wheel as it is displaced off the takeup reel disc.

In the normal reproducing mode of operation, the second lever 33 is slid in the direction of the arrow $X_1$ (FIG. 1), thereby angularly moving the L-shaped lever 54 counterclockwise about the pin 55. The slide lever 46 is then caused to slide in the direction of the arrow $Y_2$ against the resiliency of the spring 56. The spring retainer 46a displaces the spring arm 23a to the left as shown in FIG. 3 for thereby releasing the spring 23, which is brought back to its free state and imposes no force on the second arm 18. The motor 20 is then energized for a short interval of time to rotate the drive roller 21 in the direction of the arrow $A_1$. The idler wheel 15 is driven by the drive roller 21 to be angularly displaced along the direction of the arrow $B_1$ against the takeup reel disc 9. The motor 20 is de-energized again to stop the drive roller 21. Since the takeup reel disc 9 rotates clockwise during the normal reproducing mode, the idler wheel 15 upon hitting the takeup reel disc 9 is repelled away from the latter. With the torsion spring 23 being released as shown in FIG. 3, the idler wheel 15 is not subjected to resilient forces tending to bring the same against the takeup reel disc 9, and hence is forced off under a repulsive force of the takeup reel disc 9 as it rotates into a position 15D in which the idler wheel 15 is stably maintained under the force of the spring 57. In the position 15D, the idler wheel 15 is spaced slightly from the takeup reel disc 9 by a gap g so that the takeup reel disc 9 is allowed to rotate smoothly during the normal reproducing mode. At this time, the idler wheel 15 is prevented by the leaf spring 22 from being angularly displaced from the position 15D in the direction of the arrow $B_2$. Therefore, the idler wheel 15 is stably positioned away from both the supply and takeup reel discs 8, 9 during the normal reproducing mode, and the supply and takeup reel discs 8, 9 are permitted to rotate smoothly to feed along the video tape 12 reliably.

Figure 5:
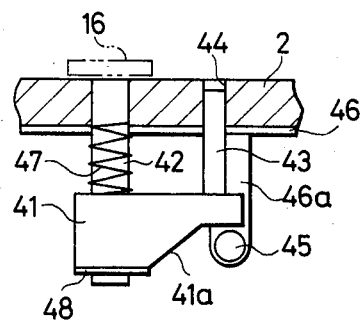
FIG. 5 is a front elevational view, partly in cross section, of an idler wheel locking device of the idler drive mechanism which is in the position of FIG. 4.
Figure 8:
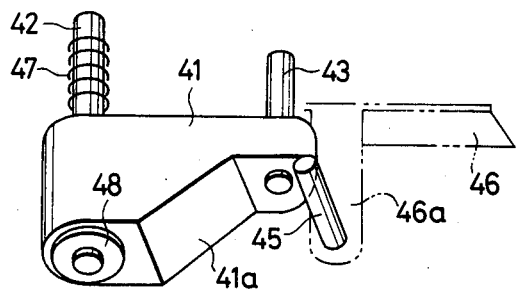
FIG. 8 is a perspective view of the idler wheel locking device.

The idler drive mechanism 10 also includes a means for more reliably retaining the idler wheel 15 in a locked position away from the supply and takeup reel discs 8, 9. More specifically, such a means comprises an idler wheel locking device 41 as best shown in FIG. 8, which is slidably supported on a pin 42 having an upper end embedded in the main deck 2, as illustrated in FIG. 5. The idler wheel locking device 41 has a slanted face 41a facing downwardly, and a vertical locking pin 43 slidably fitted in a guide hole 44 in the main deck 2, the guide hole 44 being located within the sweep of the first arm 16. The guide hole 44 is located more closely to the takeup reel disc 9 than to the supply reel disc 8. A horizontal lifter pin 45 is mounted on a bent arm 46b of the slide lever 46 and is horizontally movable into sliding engagement with the slanted face 41a. The idler wheel locking device 41 is normally urged to move downwardly into engagement with a washer 48 on a lower end of the pin 42 by a coil spring 47 disposed around the pin 42 and acting between the idler wheel locking device 41 and the underside of the main deck 2.

During the forward and reverse search modes and the stop mode of operation, the slide lever 46 is displaced to the left in the direction of the arrow $Y_2$. In this position, the lifter pin 45 is laterally spaced from the slanted face 41a, and the locking device 41 is depressed against the washer 48 under the force of the spring 47. The locking pin 43 has its upper end positioned back in the guide hole 44 below an upper surface of the main deck 2, as shown in FIG. 5. Thus, the first arm 16 is freely angularly movable over the guide hole 44 to displace the idler wheel 15 to the position 15A or 15B (FIG. 1).

Figure 4:
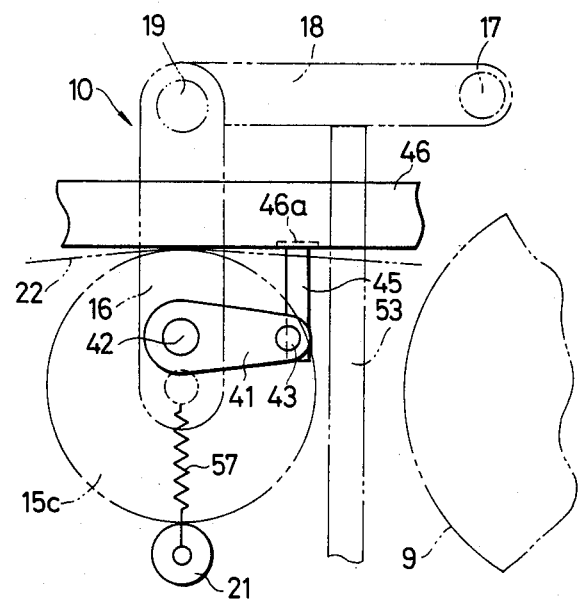
FIG. 4 is an enlarged fragmentary plan view of the idler drive mechanism shown in FIG. 1, the idler drive mechanism being in a position ready for forward and reverse search modes.

When the search mode is brought to an end, a second plunger 50 mounted on the main deck 2 is deactivated to turn a lever 51 counterclockwise about a pin 52, whereupon a lever 53 pivotably coupled to the lever 51 is slid along the direction of the arrow $X_1$. The lever 53 pushes the second arm 18 against the force of the torsion spring 23 to the position of FIG. 4, forcing the idler wheel 15 back to its neutral position 15C against the leaf spring 22 which then flexes toward the slide lever 46. Then, the second plunger 50 is actuated again to move the lever 53 away from the second arm 18 in the direction of the arrow $X_2$. The first plunger 31 is energized, as described above, to displace the second lever 33 in the direction of the arrow $X_1$, causing the L-shaped lever 54 to turn counterclockwise about the pin 55, whereupon the slide lever 46 is slid in the direction of the arrow $Y_2$ against the biasing force of the spring 56. The sliding movement of the slide lever 46 causes the lifter pin 45 to move into sliding engagement with the slanted face 41a for thereby raising the locking device 41 against the force of the coil spring 47. The upper end of the locking pin 43 now emerges upwardly from the guide hole 44, and projects beyond the upper surface of the main deck 2.

Figure 6:
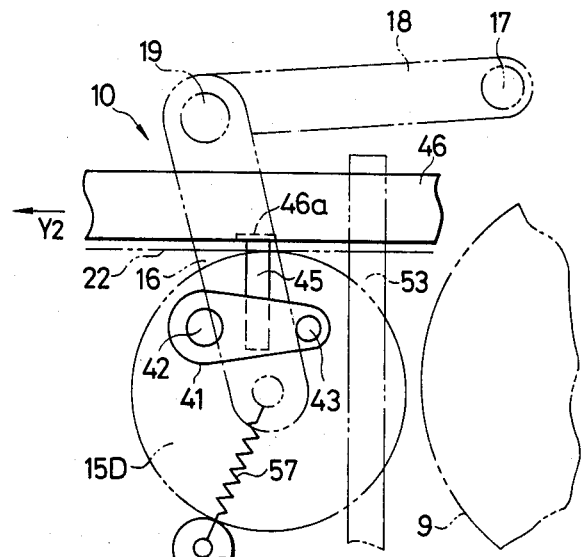
FIG. 6 is a view similar to FIG. 4, illustrating the idler drive mechanism as it is positioned in a normal reproduction mode.
Figure 7:
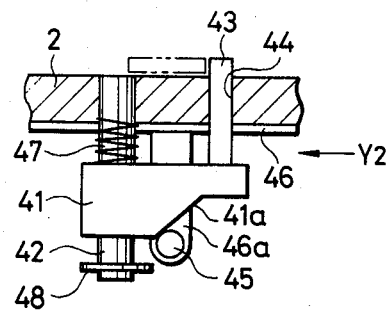
FIG. 7 is a view similar to FIG. 5, showing the idler wheel locking device as it locks the idler wheel away from the takeup reel disc during the normal reproducing mode.

Then, the motor 20 rotates for a short interval of time to rotate the drive roller 21 in the direction of the arrow $A_1$ to displace the idler wheel 15 from the neutral position 15B in the direction of the arrow $B_1$ until the first arm 16 is angularly moved counterclockwise (FIG. 6) about the pin 19 into abutting engagement with the locking pin 43. The idler wheel 15 is now located in the position 15D spaced from the takeup reel disc 9 and is prevented by the locking pin 43 from contacting the takeup reel disc 9. The idler wheel 15 is also prevented by the leaf spring 22 from moving in the direction of the arrow $B_2$. Accordingly, the idler wheel 15 is stably maintained in the position 15D without the danger of being displaced in the directions of the arrows $B_1$, $B_2$ and hence of interfering with smooth rotation of the supply and takeup reel discs 8, 9 during the normal reproducing mode of operation.

Although not shown, the locking pin 43 may be positioned more closely to the supply reel disc 8 than to the takeup reel disc 9 to keep the idler wheel 15 locked in the vicinity of the supply reel disc 8.

With the locking pin 43 located more closely to the takeup reel disc 9, a small length of the video tape 12 can be rewound by the idler wheel 15 for gaining a continuation between successive shootings in a recording mode of operation of the video tape recorder 1. More specifically, the idler wheel 15 can readily be moved in the direction of the arrow $B_2$ into contact with the supply reel disc 8 when the motor 20 rotates in the direction of the arrow $A_2$. The video tape 12 can slightly be rewound by thus rotating the supply reel disc 8 upon pause control in the reproducing mode, so that an uninterrupted series of shootings can be made.

When a search mode control button is depressed during the normal reproducing mode of operation, the first plunger 31 is de-energized to allow the slide lever 46 to slide in the direction of the arrow $Y_1$ under the force of the spring 56. The lifter pin 45 disengages from the slanted face 41a to permit the locking device 41 to be lowered under the resiliency of the spring 47, whereupon the locking pin 43 is withdrawn into the guide hole 44. Now that the first arm 16 is released of locked engagement with the the locking pin 43, the idler wheel 15 can be brought to the position 15A or 15B dependent on the direction of rotation of the motor 20.

Although a certain preferred embodiment of the present invention has been shown and described in detail, it should be understood that various changes and modifications may be made therein without departing from the scope of the appended claims.

What is claimed is:

1. An idler drive mechanism in a magnetic tape recording apparatus having supply and takeup reel discs, the magnetic tape recording apparatus being operable in forward and reverse search modes and recording and reproducing modes, said idler drive mechanism comprising:

a base;

a reversible motor mounted on said base;

a drive roller mounted on said base and rotatable by said motor;

an arm assembly pivotally mounted on said base;

an idler wheel rotatably supported on said arm assembly and selectively movably disposed between the supply and takeup reel discs, and said idler wheel being held in driven contact with said drive roller at all times and kept in a position spaced slightly from said takeup reel disc when in said recording or reproducing mode;

a slide lever slidably supported on said base and movable in a first direction when in the forward or reverse search mode and in a second direction when in the recording or reproducing mode; and a first spring operatively coupled between said arm assembly and said slide lever for urging said idler wheel from said position into driving contact with said supply or takeup reel disc dependent on the direction of rotation of said reversible motor when said slide lever is displaced in said first direction, said spring being releasable to a free state thereof when said slide lever is displaced in said second direction for thereby retracting said idler wheel away from said supply or takeup reel disc into said position.

2. An idler drive mechanism according to claim 1, including a second spring acting between said base and said slide lever for normally urging said slide lever to be displaced in said first direction.

3. An idler drive mechanism according to claim 1, including a third spring acting between said arm assembly and said drive roller for normally urging said idler wheel in a direction to be pressed against said drive roller.

4. An idler drive mechanism according to claim 1, including a plunger actuatable when the magnetic tape recording apparatus is to enter the recording or reproducing mode, and a lever assembly operatively connected between said plunger and said slide lever for displacing the latter in said first direction when said plunger is actuated.

5. An idler drive mechanism according to claim 1, wherein said arm assembly comprises a first and a second arm pivotably connected to each other, said idler wheel being rotatably mounted on said first arm, said second arm being pivotably mounted on said base.

6. An idler drive mechanism according to claim 5, wherein said slide lever has a spring retainer, said first spring comprising a torsion spring having a first end held in operative engagement with said spring retainer, and a second end engaging said second arm.

7. An idler drive mechanism according to claim 1, including means on said base for retaining said idler wheel in said position spaced slightly from said takeup reel disc when said slide lever is displaced in said second direction.

8. An idler drive mechanism according to claim 7, including a plunger mounted on said base, a first lever operatively connected to said plunger and pivotably mounted on said base, and a second lever pivotably mounted on said first lever and engageable with said arm assembly to displace said idler wheel out of driving contact with said supply or takeup reel disc when said plunger is deactivated upon entering the recording or reproducing mode, said plunger being actuatable again to retract said second lever out of engagement with said arm assembly when said slide lever is displaced in said first direction.

9. An idler drive mechanism according to claim 7, including a leaf spring mounted on said base for engaging said idler wheel when the latter is in said locked position to thereby prevent said idler wheel from moving into driving contact with the supply or takeup reel disc.

10. An idler drive mechanism according to claim 7, wherein said base has a fixed shaft and a guide hole, said means comprising an idler wheel locking device movably supported on said fixed shaft and having a locking pin slidably fitted in said guide hole, said idler wheel locking device having a slanted face, and a lifter pin mounted on said slide lever and slidably engageable with said slanted face when said slide lever is displaced in said second direction for lifting said locking pin through said guide hole into engagement with said arm assembly to retain said idler wheel in said locked position.

11. An idler drive mechanism according to claim 10, wherein said means further includes a coil spring disposed around said fixed shaft and acting between said base and said idler wheel locking device for normally urging said locking pin to be displaced back into said guide hole.

12. An idler drive mechanism in a magnetic tape recording apparatus having supply and takeup reel discs, said magnetic tape recording apparatus being operable in forward and reverse search modes and recording and reproducing modes, said idler drive mechanism comprising:
first drive means for driving said takeup reel disc when said magnetic tape recording apparatus operates in said recording and reproducing modes, said first drive means comprising s first motor, a first idler wheel rotatable through transmission means by said first motor for rotating said takeup reel disc;
second drive means for driving said takeup reel disc or said supply reel disc when said magnetic tape recording apparatus operates in said forward or reverse search mode, said second drive means comprising a second motor, a drive roller rotatable thereby, a second idler wheel held against said drive roller for being rotated thereby, a first spring urging said second idler wheel against said drive roller, and an arm assembly rotatably supporting second said idler wheel;
mode switching means for switching between said forward and reverse search modes and recording modes, said switching means comprising a plunger, a lever actuatable by said plunger, a slide lever movable by said lever between a first position for selecting said recording and reproducing modes and a second position for selecting said forward and reverse search modes, said slide lever having a spring retainer, and a second spring acting between said spring retainer and said arm assembly for co-acting with said second spring to bring said second idler wheel into driven contact with said takeup or supply reel disc dependent on the direction of rotation of said second motor; and
a leaf spring disposed adjacent to said second idler wheel, said second spring being releasable to keep said second idler wheel in a position slightly spaced from said takeup reel disc in cooperation with said leaf spring when said slide lever is moved to said second position for the recording and reproducing modes.

* * * * *